May 30, 1950  J. M. RUDISELL  2,509,698
DEVICE FOR GUIDING CUTTING TORCHES
Filed Dec. 31, 1947  4 Sheets-Sheet 1
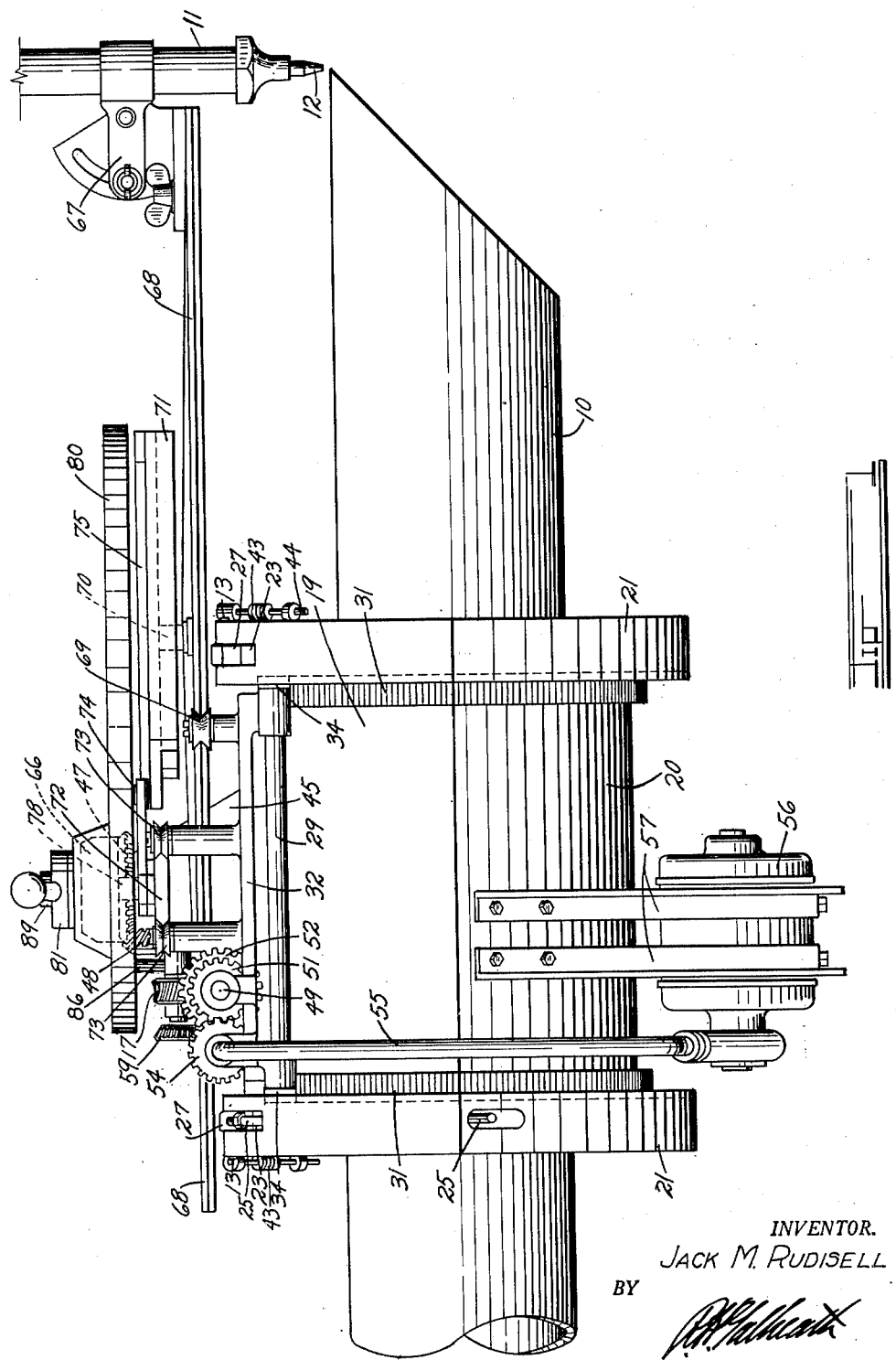
INVENTOR.
JACK M. RUDISELL
BY
ATTORNEY May 30, 1950  J. M. RUDISELL  2,509,698
DEVICE FOR GUIDING CUTTING TORCHES
Filed Dec. 31, 1947  4 Sheets-Sheet 2
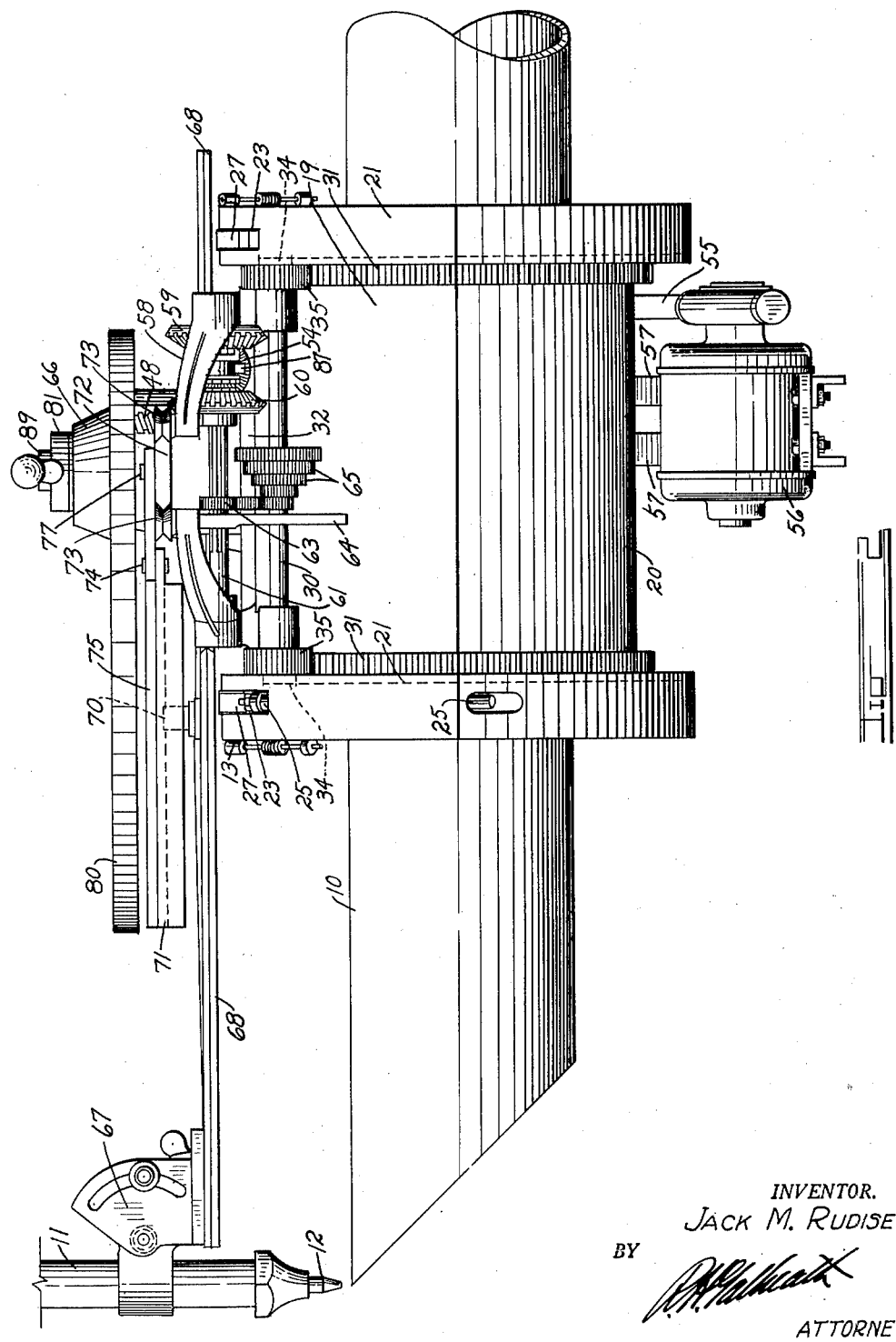
INVENTOR.
JACK M. RUDISELL
BY
ATTORNEY

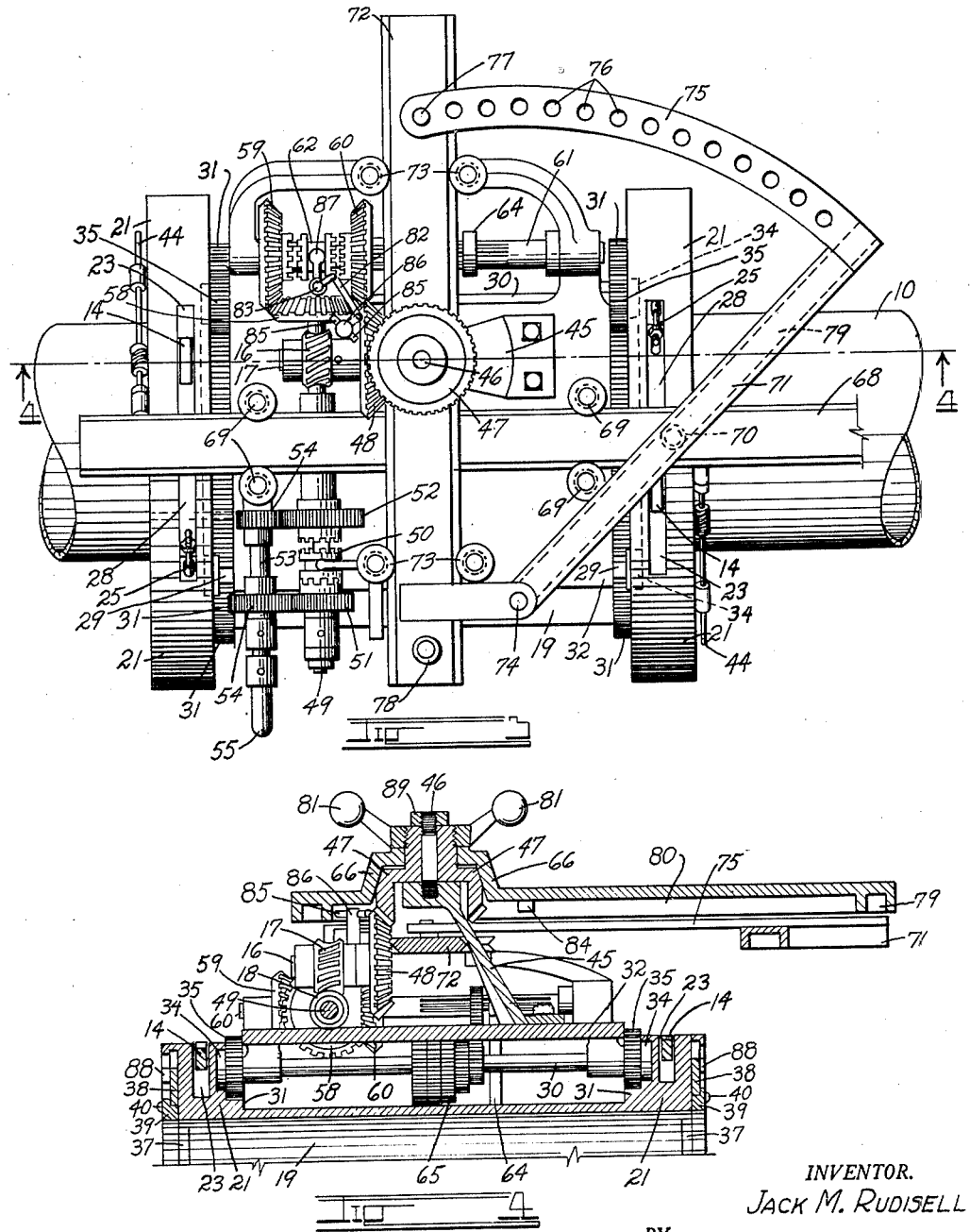

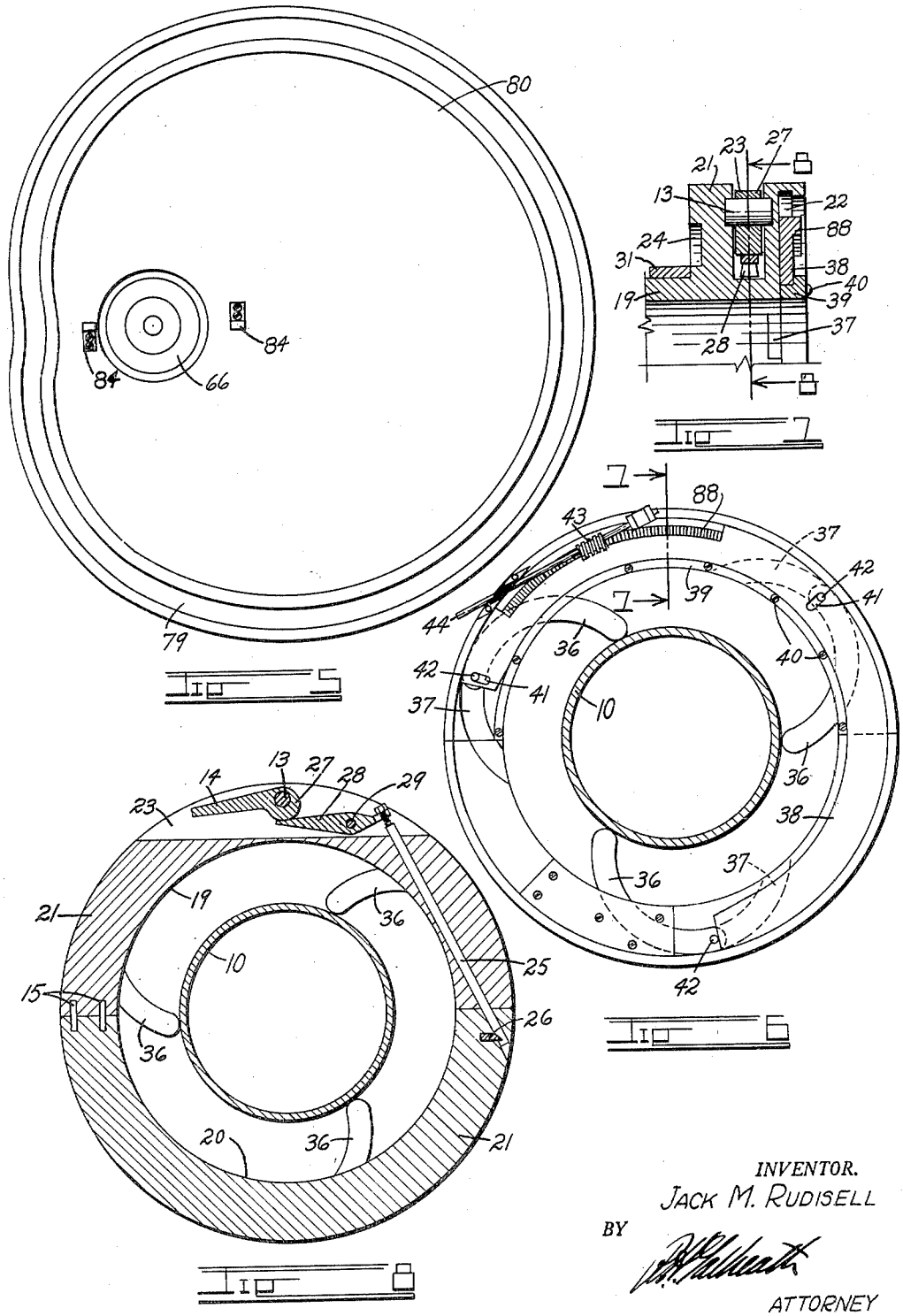

Patented May 30, 1950

2,509,698

UNITED STATES PATENT OFFICE 2,509,698

DEVICE FOR GUIDING CUTTING TORCHES

Jack M. Rudisell, Hominy, Okla.

Application December 31, 1947, Serial No. 794,989

6 Claims. (Cl. 266—23)

This invention relates to a machine for automatically guiding a cutting torch or a marking tool over the surface of large diameter pipe for accurately outlining the cutting line for forming elbows, T's, and other joints between pipe lengths, and between the pipe and other conduits, tanks, etc.

The principal object of the invention is to provide a simple and highly efficient device which can be quickly and easily attached about a length of pipe of any diameter, and which can be preset to easily and accurately produce a cutting outline of any required shape upon the pipe without requiring highly skilled labor.

Other objects and advantages reside in the highly efficient and accurate means provided for adjusting the machine for different diameters of pipe and for different contours of cut.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a side view of the improved pipe-cutting machine, illustrating it in place on a length of pipe;

Fig. 2 is a similar view, illustrating the opposite side of the machine;

Fig. 3 is a top plan view thereof, with the operating cam removed;

Fig. 4 is a fragmentary, longitudinal section, taken on the line 4—4, Fig. 3;

Fig. 5 is a detail bottom view of a contour cam employed in the improved machine;

Fig. 6 is an end view of a pipe-receiving barrel employed in the improved machine, showing the means for attaching it to a pipe;

Fig. 7 is an enlarged detail section therethrough, taken on the line 7—7, Fig. 6; and Fig. 8 is a vertical cross-section, taken on the line 8—8, Fig. 7.

The invention is more particularly designed for guiding a cutting torch and making the actual cut. It could, however, guide anything else, such as a marking tool for outlining the cut to be made. It will be herein described as applied to a cutting torch. The invention is designed for making either contoured circumferential cuts around a length of pipe, or for cutting openings in the side of a length of pipe for connecting to a side entering pipe at various angles.

In the drawing, a length of pipe is illustrated at 10, with its extremity being cut at an angle of 45° by means of a conventional gas cutting torch 11, the cutting tip of which is illustrated at 12.

The invention is mounted on a cylindrical drum of an internal diameter to fit around the largest expected pipe. The drum is formed in two halves from two semi-cylindrical drum sections, one of which will be herein designated the upper drum section 19 and the other the lower drum section 20.

The sections 19 and 20 terminate in enlarged terminal flanges 21 shown in section in Fig. 7. The terminal flanges 21 are provided with annular dovetailed face grooves 22 on their outer faces, and with roller grooves 24 in their inner faces. Each flange is notched across the top as shown at 23.

The two sections 19 and 20 are pulled together by means of pull rods 25, there being one pull rod in each terminal flange positioned at opposite sides of the pipe 10. The lower extremities of the rods 25 are notched to engage lugs 26 in the lower sections 20. Each of the rods is pulled upwardly to clamp the sections together by rotation of a cam 27 which acts against a cam lever 28 tiltably mounted in the cross notch 23 upon a pivot shaft 29. The outer extremity of each lever 28 supports one of the pull rods 25. The cams are mounted on cam pins 13 and provided with handles 14.

It can be seen that rotation of the cams 27 will pry the outer extremities of the levers 28 upwardly to pull the rods 25 against the lugs 26 to clamp the two sections together. The flanges 21 are guided together at the opposite side of the pipe 10 by means of suitable dowel pins 15.

The sections 19 and 20 are supported concentrically about the pipe 10 by means of arcuate arms 36 which are slidably mounted in curved grooves 37 in the face of each terminal flange 21. The arms 36 are pushed inwardly by means of an arcuate clamp bar 38 which is slidably mounted in the dovetailed groove 22 of each terminal flange. The bars 38 are held in place by means of semi-circular removable guide rings 39 which are secured to the upper terminal flanges by means of suitable screws 40, as shown in Figs. 6 and 7. The curved bars 38 are provided with radially extending, elongated pin openings 41. The inner extremity of each of the upper arms 36 carries a pin 42 projecting through one of these openings, and the lower arm 36 carries a similar pin 42 against which the end of the bar 38 contacts.

It can be seen that if the bar 38 is rotated in one direction, it will pull the arms 36 into their curved grooves 37, and when rotated in the other direction, will project all of the arms inwardly from their grooves into concentric contact with the pipe 10. The rotation is accomplished by means of a worm 43 which engages teeth 88 formed in the ring 36. The worm 43 is mounted on a worm shaft 44 having a wrench-engaging extremity for receiving a socket wrench, by means of which it may be rotated. In use, the worm is rotated to bring the arms 36 tightly against the pipe 10 to rigidly support the complete drum 19—20 concentrically thereabout.

A ring gear 31 is secured to and surrounds the complete drum adjacent the inner face of each terminal flange. The ring gears are, of course, split to correspond to the split in the drum between the two sections 19 and 20.

A carriage 32 is arranged to rotate completely around the drum 19—20. The carriage 32 is held in place by means of cross shafts 29 and 30, each of which terminates in bearing rollers 34 riding in the inner roller grooves 24 of the terminal flanges. The cross shaft 30 is provided with pinion gears 35 which mesh with the teeth of the ring gears 31 to revolve the carriage about the axis of the pipe.

A bracket arm 45 arises from the carriage 32, and a cam stud 46 arises from the bracket arm 45. A cup gear 47 is rotatably mounted on the stud 46 and held in place by a threaded nut 89. The cup gear 47 is driven from a countershaft gear 48. The countershaft gear is mounted on the extremity of a countershaft 16 carrying a worm gear 17 which is driven from a worm 18 mounted on a worm shaft 49 extending transversally of the carriage 32.

The worm shaft 49 is driven from a splined toothed clutch 50, which can be reciprocated between change speed gears 51 and 52 which are rotatable on the shaft 49. The gears 51 and 52 are of different diameters so as to rotate at different speeds and are driven from drive gears 54 on a motor shaft 53.

Thus, when the clutch 50 is moved into contact with the gear 51, it drives the worm shaft 49 at a higher speed than when moved into contact with the gear 52. The shaft 53 is driven through the medium of a flexible shaft 55 from a motor 56. The motor 56 is carried upon a motor bracket 57 from the lower drum section 20. Thus, it can be seen that the motor rotates the cup gear 47 at either of two different speeds.

The motor also causes the entire carriage to revolve about the drum 19—20. This is accomplished through the medium of a drive pinion 58 mounted on the extremity of the shaft 49. This pinion is in constant mesh with two driven bevel gears 59 and 60, which rotate in opposite directions upon a gear shaft 61. A shifting clutch dog 62 is splined upon the shaft 61 so that when shifted in one direction, it will connect the shaft with the gear 59, and when shifted in the other direction, will connect the shaft with the gear 60 so that the gear shaft 61 can be caused to rotate in either direction.

The shaft 61 is slotted longitudinally to form elongated gear teeth, and a sliding gear 63 meshes with these teeth. The sliding gear 63 is mounted on a handle 64, by means of which it may be lifted and moved along the shaft 61. The sliding gear is for the purpose of driving the cross shafts 30 at different speeds.

The shaft 30 is provided with a plurality of driven gears 65 of varying diameters. Thus, the gear 63 can be placed in driving relation with any selected one of the gears 65 to drive the cross-shaft 30 at any desired speed to cause the carriage to rotate about the axis of the pipe at any desired speed.

The cutting torch 11 is carried in a suitable adjustable holder 67. The holder 67 is adjustably mounted on the extremity of a torch beam 68. The torch beam is provided with pointed side edges which travel in grooved rollers 69 supported from the carriage, which supports the beam 68 and guides it in an accurate longitudinal path back and forth across the carriage.

The beam 68 has an upstanding roller 70 which extends into a bottom groove in a sector arm 71. The sector arm is hingedly mounted on a traverse bar 72 having pointed side edges which are supported in supporting and guiding rollers 73 so that it will move at right angles to the beam 68.

The sector arm 71 is hinged upon a hinge pin 74 from the traverse bar 72 at its one extremity, and is braced at its other extremity from the traverse bar by means of an arcuate sector 75. The sector 75 is provided with a plurality of spaced-apart adjustment holes 76 which fit over a boss 77 projecting from the traverse bar 72. This allows the angle of projection of the sector arm 71 to be varied at will.

It can be seen that if the traverse bar 72 be moved back and forth it will, through the rolling action of the roller 70 traveling in the inclined groove in the arm 71, cause the torch beam 68 to move back and forth.

The back-and-forth movement of the traverse bar 72 is accomplished by means of a cam roller 78 which is rotatably mounted on the traverse bar 72 and extends upwardly therefrom into a downwardly extending cam groove 79 in a disc cam 80. The cam 80 is provided with a bottom taper socket 66 which fits over and frictionally engages the cup gear 47. The cam 80 is clamped down upon the cup gear 47 by means of a handle nut 81 threaded on the hub of the gear 47. The cam 80 may have any desired contour, depending upon the work to be accomplished.

It can be readily seen that as the cam 80 rotates, the roller 78 will follow the contour of the groove 79 therein, causing the traverse bar 72 to move back and forth on the carriage 32.

For a 45° cut such as shown in Figs. 1 and 2, the device is clamped around the pipe 10 and the proper cam 80 is put in place for a 45° cut. The sector 75 is then adjusted to the proper diameter of the pipe, for it is evident that the torch need not move forward and back as far on a small pipe as it does on a large pipe. The amount of movement of the torch forward and back is adjusted by varying the angle of the arm 71.

After this setting has been made, the torch is started at the marked point and the motor is started. This causes the entire carriage to travel completely around the pipe, and during its travel the torch arm 68 will move forward and back the proper amount to cut the pipe and on a 45° plane.

For cutting the end of a pipe so that it may fit against the side of another pipe, it is necessary that the torch move forward and back twice during one revolution of the table. This is accomplished by setting the sliding gear 63 at the proper point to slow down the travel of the carriage so that the cam may rotate twice during one revolution of the carriage.

For cutting a hole in the side of a piece of pipe to receive the end of another pipe, it is necessary for the carriage to reverse itself and travel back over the pipe to its starting place during one revolution of the cam. This is accomplished by automatically shifting the clutch dog 62. The shifting is accomplished by means of trip lugs 84 projecting downward from the bottom of the cam 80. These lugs strike trip arms 85 rotatably mounted below the cam on a vertical trip shaft 86. The shaft 86 is connected by means of a connecting rod 82 with a yoke shaft 83. A forked lever 87 projects from the yoke shaft into engagement with the clutch 62 to shift the latter back and forth between the reversing gears 59 and 60. Thus the carriage will move back and forth around the pipe during each complete rotation of the cam. The trip lugs 84 are removable when not desired.

While the machine has been described for making angular and curved cuts it of course could be used for straight cuts by simply stopping the rotation of the cam 80. As illustrated the machine is shown driven by an electric motor 56. This motor, of course could be replaced by a small portable gasoline engine or any other motive power or if no power is available the flexible shaft could be rotated by means of a hand crank.

The cam 80 can of course be replaced by other cams of differing contours to accomplish any desired contour of cut.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for guiding a cutting torch about a pipe, comprising: a drum; means for clamping said drum about said pipe; circular tracks about said drum; rollers traveling in said tracks; a carriage supported by said rollers so that it may travel about the axis of said pipe; a cam carried by said carriage; means for rotating said cam and said carriage simultaneously; a torch supporting beam slidably mounted on said carriage parallel to the axis of said pipe; a traverse bar slidably mounted on said carriage to move at right angles to and across said torch supporting beam; a cam follower carried by said traverse arm following the contour of said cam; a sector arm projecting at an angle from said traverse arm; and a roller projecting from said torch supporting beam into contact with said traverse arm so that the transverse movement of said traverse arm will be converted into longitudinal movement of said torch supporting beam.

2. A device for guiding a cutting torch about a pipe, comprising: a drum; means for clamping said drum about said pipe; circular tracks about said drum; rollers traveling in said tracks; a carriage supported by said rollers so that it may travel about the axis of said pipe; a cam carried by said carriage; means for rotating said cam and said carriage simultaneously; a torch supporting beam slidably mounted on said carriage parallel to the axis of said pipe; a traverse bar slidably mounted on said carriage to move at right angles to and across said torch supporting beam; a cam follower carried by said traverse arm following the contour of said cam; a sector arm projecting at an angle from said traverse arm; a roller projecting from said torch supporting beam into contact with said traverse arm so that the transverse movement of said traverse arm will be converted into longitudinal movement of said torch supporting beam; a sector extending from said sector arm to said traverse arm; and means for varying the position of said sector on said traverse arm to change the angle of the sector arm to vary the length of the movement of said torch supporting beam.

3. In a device for guiding a cutting torch about a pipe: a drum adapted to surround said pipe; annular terminal flanges at each extremity of said drum, there being a circumferential groove inset in the inside face of each flange; cross shafts extending between the grooves of the opposite flanges; rollers on said cross shafts riding in said grooves; a carriage mounted on said cross shafts; a motor supported from said carriage; ring gears surrounding said drum adjacent said grooves; spur gears of one of said cross shafts engaging the teeth of said ring gears; a drive shaft carried by said carriage; a reverse gear set transmitting power from said drive shaft to the latter cross shaft for driving said carriage around said drum; means for driving said drive shaft from said motor; a cam rotatably mounted on said carriage and driven from said drive shaft; and means on said cam adapted to contact said reversing gear for actuating the latter to reverse the direction of rotation of said carriage about said drum at pre-set times.

4. A device for guiding a cutting torch about a pipe, comprising: an upper drum section; a lower drum section; means for clamping said two drum sections together to form a cylindrical drum about a pipe; means for concentrically clamping the assembled drum to said pipe; annular tracks carried by said assembled drum; a carriage arranged to travel circumferentially around said drum, guided by said tracks; a traverse arm extending across said carriage at right angles to the axis of said pipe; a rotatable cam on said carriage; means for communicating the eccentricity of said cam to said traverse arm; a torch supporting beam carried by said carriage and arranged to move parallel to the axis of said pipe and at right angles to said traverse arm; a sector arm extending at an angle from said traverse arm; and means on said torch beam contacting said sector arm and transmitting the transverse movement of the traverse arm into longitudinal movement of said torch arm.

5. In a device for guiding a cutting torch about a pipe: a drum adapted to surround said pipe; annular terminal flanges at each extremity of said drum, there being a circumferential groove inset in the inside face of each flange; cross shafts extending between the grooves of the opposite flanges; rollers on said cross shafts riding in said grooves; a carriage mounted on said cross shafts; a motor supported from said carriage; ring gears surrounding said drum adjacent said grooves; spur gears on one of said cross shafts engaging the teeth of said ring gears; a drive shaft carried by said carriage; a cam mounted on said carriage; a torch-supporting beam slidably mounted on said carriage so as to move longitudinally of said pipe; a traverse bar intersecting said torch beam at right angles and being slidably mounted on said carriage; an angularly positioned roller track extending from said traverse bar; a roller on said torch beam traveling in said track; a second roller on said traverse bar extending upwardly therefrom; a cam track on the bottom of said cam receiving said second roller; and means for rotating said cam from said drive shaft.

6. In a device for guiding a cutting torch about a pipe: a drum adapted to surround said pipe; annular terminal flanges at each extremity of said drum, there being a circumferential groove inset in the inside face of each flange; cross shafts extending between the grooves of the opposite flanges; rollers on said cross shafts riding in said grooves; a carriage mounted on said cross shafts; a motor supported from said carriage; ring gears surrounding said drum adjacent said grooves; spur gears on one of said cross shafts engaging the teeth of said ring gears; a drive shaft carried by said carriage; two oppositely moving gears driven by said drive shaft; means for transmitting the rotation of either gear to said latter cross shaft; a clutch positioned between said gears to engage either gear; a clutch-shifting device extending from said clutch to a point adjacent said cam; and means projecting from said cam for operating said clutch-shifting device at pre-set positions of said cam.

JACK M. RUDISELL.

REFERENCES CITED

The following references are of record in the file of this patent:

UNITED STATES PATENTS

| Number | Name | Date |
| --- | --- | --- |
| 1,860,653 | Brown | May 31, 1932 |
| 1,885,107 | Brown | Nov. 1, 1932 |
| 2,021,441 | Brown | Nov. 19, 1935 |
| 2,295,182 | Norton | Sept. 8, 1942 |
| 2,334,301 | Young | Nov. 16, 1943 |
| 2,379,630 | Fall | July 3, 1945 |
| 2,432,161 | Johnston | Dec. 9, 1947 |
| 2,432,703 | Walden | Dec. 16, 1947 |